March 26, 1968     A. J. ANTUNOVIC     3,375,496

DECELERATION INDICATOR FOR MOTOR VEHICLES

Filed Aug. 23, 1965

INVENTOR

Anthony J. Antunovic

BY *James G. O'Boyle*

ATTORNEY

United States Patent Office 3,375,496
Patented Mar. 26, 1968

3,375,496
DECELERATION INDICATOR FOR
MOTOR VEHICLES
Anthony J. Antunovic, Lake Drive W.,
Inverness, Fla. 32650
Filed Aug. 23, 1965, Ser. No. 481,502
4 Claims. (Cl. 340—72)

ABSTRACT OF THE DISCLOSURE

A signalling device for motor vehicles incorporated in an electrical circuit adapted to be energized and display a warning signal when the operator of the vehicle removes his foot from the accelerator pedal, said signalling device being mounted at the rear of the vehicle in a position to be readily visible to the driver of a following vehicle; and wherein the electrical circuit associated with the device is independent of the conventional warning signals with which the vehicle is equipped.

---

Heretofore, it has been suggested to provide a deceleration indicator for automotive vehicles adapted for actuation in conjunction or in sequence with the conventional warning signals of the vehicle. In one suggested arrangement an electrical circuit, incorporating a signal that the vehicle is about to slow down, is energized upon removal of the operator's foot from the accelerator pedal, and when the brake pedal is subsequently depressed, the circuit incorporating the deceleration signal is de-energized. In another suggested arrangement, a warning signal comprising a housing having lenses of different color, for example, a green lens and a red lens, is mounted at the rear of the vehicle. The electrical circuits in which the light sources are incorporated are designed to be alternatively energized by actuation of the accelerator pedal, that is to say, when the operator removes his foot from the pedal, the red light is energized to indicate that the vehicle is coming to a stop, and when the pedal is depressed, the green light is energized to indicate that the vehicle is about to get underway.

While the above-noted warning signal arrangements no doubt function satisfactorily for their intended purposes, they are open to certain objections which are inherent in their basic design. In this connection, it will be observed that the operational concept involved in each system is to alternately display a signal of selected color when the motor is running and the accelerator pedal is depressed, and to display a signal of different color when the accelerator pedal is released or when the brake pedal is actuated.

In accordance with the signal arrangement of the present invention, a warning signalling device of one selected color only, namely, yellow-orange is employed. The signalling device is incorporated in an electrical circuit adapted to be energized and display the warning signal when the operator removes his foot from the accelerator pedal, said electrical circuit being de-energized when the pedal is depressed to initiate movement of the vehicle. The signalling device is mounted on the rear portion of the vehicle in a position to be clearly and readily visible to the driver of a following vehicle; the electrical circuit associated with the device is relatively simple, and is completely independent of the conventional warning signals with which the vehicle is equipped.

One of the hazards of driving on relatively high speed, superhighways, such as turnpikes and the like, stems from the fact that many automobile drivers lack depth perception, and additionally, are inattentive or preoccupied when entering or leaving the highway. Statistics show that accident rates in various localities tend to increase as visibility decreases, and accordingly, greater caution must be exercised under conditions of poor visibility, for example, when driving at night or when fog or rain is encountered. It is well known that it is difficult, if not impossible, for a driver to accurately judge the distance from his car to a preceding car at night by merely observing the tail lights, or to be able to determine whether or not stop signals are being displayed, for the reason that due to differential distances between the vehicles, there are periods when the stop lights appear to merge with the tail lights, and the warning effect of the "stop" signals is not discernible.

In accordance with the present invention, the deceleration light signal is of sharp color contrast, as compared with the conventional tail lights and stop lights, and immediately when the driver removes his foot from the accelerator pedal, whether it be accidental, or intentional as when slowing down or coming to a complete stop, the caution light is displayed and the driver of a following vehicle is warned in ample time to take appropriate action.

It will be appreciated that the advantages of the improved deceleration signal of the present invention is not limited to night driving. The device is equally efficient as a warning signal for use in daylight; a situation in which it will be found most useful is when the vehicle is not in motion while waiting for a traffic light to change, the warning signal will serve as a visible, unmistakeable caution sign to the driver of a vehicle approaching from the rear, so as to avoid collision and injury of the driver and passengers in the vehicle which is at rest, due to "whiplash."

An object of the invention is to provide an improved deceleration indicator for motor vehicles.

Another object of the invention is to provide an improved deceleration indicator operatively connected to the accelerator pedal of the vehicle, whereby when the operator removes his foot from the pedal a distinctive caution signal is displayed.

Still another object of the invention is to provide an improved deceleration indicator having switch means operatively connected to the accelerator pedal of a vehicle, said switch means and associated electrical circuits being completely independent of the conventional warning signal devices with which the vehicle is equipped.

Yet another object of the invention is to provide an improved deceleration indicator arrangement wherein a plurality of light sources are employed, said light sources being adapted, when energized, to cause a plurality of linear light signals of an approved color denoting caution, to be displayed.

A further object of the invention is to provide a deceleration indicator having a plurality of linear light sources adapted, when energized, to display light signals of an approved color denoting caution, at least one of said light sources being continuously energized, the remaining light sources being intermittently, alternately energized, when the operator of the vehicle removes his foot from the accelerator pedal.

Yet a further object of the invention is to provide an improved deceleration indicator arrangement for motor vehicles, which is strong and rugged in construction, consisting of but few parts not liable to get out of order, even after long and continued use.

With these and other objects in view, which may be incident to my improvements, the invention consists in the parts and combinations to be hereinafter set forth and claimed, with the understanding that the several necessary elements, comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions which, for the purpose of explanation, have been made the subject of illustration.

Figure 1:
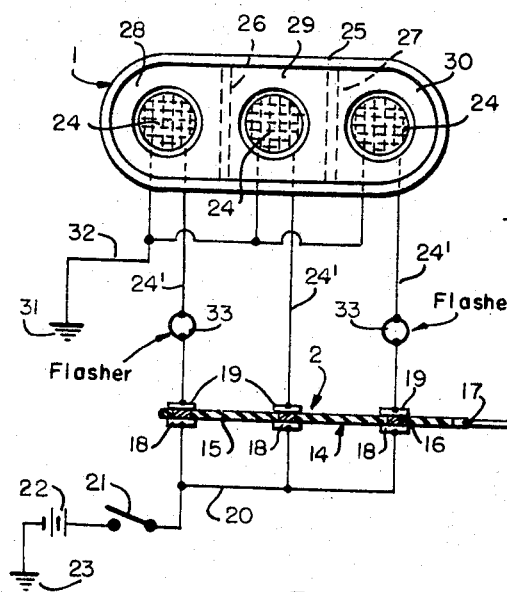
FIGURE 1 is a diagrammatic view of the deceleration indicator of the present invention.
Figure 2:
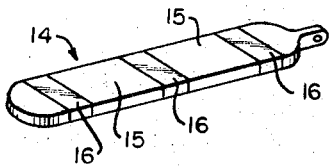
FIGURE 2 is a perspective view of the movable member of the switch means employed with electrical circuits of the deceleration indicator illustrated in FIGURE 1.

Referring to the drawings, and more particularly to FIGURE 1, the deceleration indicator of the present invention comprises, essentially, a light signal indicator, designated generally by the numeral 1, connected to switch means 2 actuated by the vehicle accelerator pedal 3. The lower end of the accelerator pedal is hingedly connected to the vehicle floor board 4 as at 5, and a push rod 6 for actuating the carburetor throttle is pivotally connected as at 7 to the upper end of the accelerator pedal. A coil spring 8 is mounted on one side of the vehicle floor board 4 for urging the accelerator pedal in a direction away from the floor board, whereby to provide a continuous biasing force for urging the carburetor throttle to closed position. A bell crank lever 9 is pivotally connected as at 10, to an arm 10' secured to the underside of the floor board. The longer arm 9' of the bell crank lever extends through the floor board and is pivotally connected to the accelerator pedal as at 11, the other arm of the bell crank being pivotally connected as at 13, to one end of a rod 12 adapted to actuate the movable member of the switch means associated with the light signals of the deceleration indicator, as will be described more fully hereinafter.

By means of the construction and arrangement of the accelerator pedal and associated linkage, thus far described, it will be readily apparent that when the accelerator pedal is depressed, thereby compressing spring 8, push rod 6 moves inwardly relative to the floor board to open the carburetor throttle; while simultaneously, the bell crank lever 9 is pivoted in a counter-clockwise direction to cause the rod 12 to move toward the floor board; that is, in a direction opposite to that of the push rod 6. When the accelerator pedal is released, the spring 8 urges the pedal 3 away from the floor board and the push rod 6 and rod 12 are returned to their original positions.

The switch means 2 for the deceleration indicator comprises a movable member 14 having a body portion 15 of suitable insulating material, and a plurality of spaced electrical conducting bands or strips 16 secured thereto. The movable member 14 is pivotally connected to the end of rod 12, as at 17, and is slidably supported within the gaps defined by a plurality of spaced contacts 18, 19, as shown in FIGURE 1. A lead 20 is provided for connecting the contacts 18 to the vehicle ignition switch 21 which, in turn, is connected to the vehicle battery 22 grounded at 23, the contacts 19 being connected to the light sources of the indicator 1 through leads 24'.

The deceleration indicator of the present invention comprises, a housing 25 having spaced partitions 26 and 27 which divide the housing into three compartments 28, 29 and 30. Each of the compartments is provided with a light bulb 24 connected through a lead 24' to one of the contacts 19, and to ground 31 through a lead 32, the leads 24' to the outboard light bulbs being provided with flashing devices 33. Each of the compartments is closed at its exposed or sight face with a cover plate of glass or suitable plastic having a yellow or yellow-orange color conventionally employed to indicate a "caution" signal. The deceleration indicator is mounted on the rear of the vehicle in such manner that the light signals will be readily visible to the driver of a following vehicle.

In the operation of the deceleration indicator of the present invention, when the movable member 14 of the switch means is in the position illustrated in FIGURE 1, the bands or strips 16 bridge the gaps between contacts 18 and 19, whereby when the ignition switch 21 is closed the light bulbs are illuminated, the outboard bulbs flashing, while the center bulb is continuously illuminated. When the accelerator pedal 3 is depressed, as described hereinabove, the rod 12 and associated movable member 14 are moved to the right as viewed in FIGURE 1, thereby moving the conductors 16 from their bridging positions between the contacts 18 and 19 whereby the circuits to the light bulbs are simultaneously opened.

Figure 4:
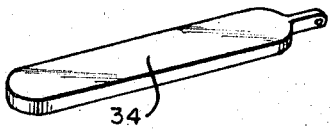
FIGURE 4 is a perspective view of the movable member of the switch means employed with the deceleration indicator illustrated in FIGURE 3.
Figure 3:
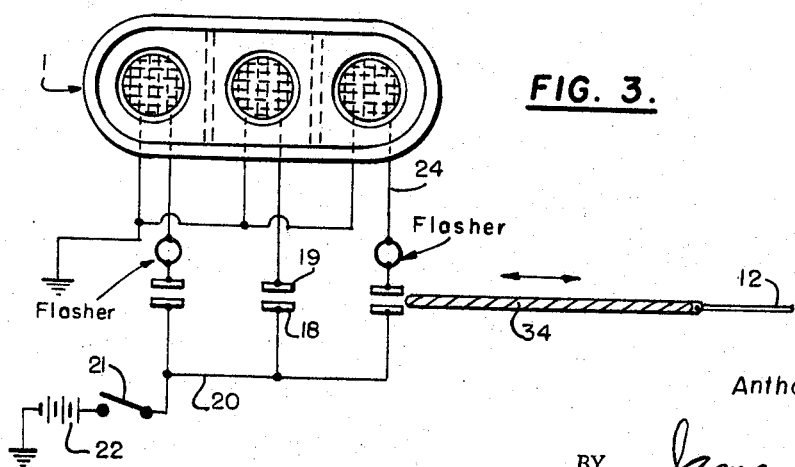
FIGURE 3 is a diagrammatic view of a modified switch means for use with the deceleration indicator of the present invention.

A modification of the movable member of the switch means is illustrated in FIGURES 3 and 4, wherein the movable member 34 consists of a metal plate adapted to slide within the gaps defined by the spaced contacts 18 and 19 and bridge the same to complete the circuits to the light bulbs. In this construction and arrangement, reciprocatory movement of the plate 34 relative to the contacts 18 and 19, when the accelerator pedal is released or depressed, will result in a sequential illumination or extinguishment of the light bulbs. It will be noted that in the modified arrangement, one of the light signals is displayed as soon as the pressure on the accelerator pedal is slightly decreased; a second signal is displayed upon further release of the pedal, and finally, when the pressure is completely removed, all of the signals are displayed. It will be understood that the position of the movable member 34 shown in FIGURE 3, corresponds to the "off" or depressed position of the accelerator pedal illustrated in FIGURE 1.

While I have shown and described preferred embodiments of my invention, I wish it to be understood that I do not confine myself to the precise details of construction herein set forth by way of illustration, as it is apparent that many changes and variations may be made therein, by those skilled in the art, without departing from the spirit of the invention or exceeding the scope of the appended claims.

I claim:

1. In a motor vehicle, including an accelerator pedal and an electrical system embodying an ignition circuit incorporating switch means for opening and closing said circuit a deceleration indicator comprising a housing having a plurality of compartments therein, a light source in each compartment, and a cover plate having an area of approved color for denoting caution positioned in front of each light source, an electrical circuit operatively connected to each light source and to the motor vehicle's electrical system through the switch means of the ignition circuit, each of the light source circuits incorporating a pair of spaced contacts defining a gap therebetween; switch means interposed in the circuits of the light sources comprising a movable member slidably supported within the gaps, said movable member having a body portion formed from insulating material, and a series of electrical conducting bands secured in spaced relation thereon, one end of the movable member being pivotally connected to an actuating rod operatively connected to the accelerator pedal, whereby when the said pedal is released, the bands carried by the movable member bridge the gaps between the contacts of the light source circuits to thereby energize the light sources and display visible caution light signals.

2. In a motor vehicle deceleration indicator in accordance with claim 1, wherein at least one of the circuits to the light sources is continuously energized when the accelerator pedal is released whereby to display a constant caution light signal, and the remaining light source circuits are intermittently energized, whereby to display flashing, caution light signals.

3. In a motor vehicle, including an accelerator pedal and an electrical system embodying an ignition circuit incorporating switch means for opening and closing said circuit, a deceleration indicator comprising a housing having a plurality of compartments therein, a light source in each compatment and a cover plate having an area of approved color for denoting caution positioned in front of each light source, an electrical circuit operatively connected to each light source and to the motor vehicle's electrical system through the switch means of the ignition circuit, each of the light source circuits incorporating a pair of spaced contacts defining a gap therebetween; switch means interposed in the circuits of the light sources comprising a movable member having a body portion formed from electrical conducting material, one end of the movable member being pivotally connected to an actuating rod operatively connected to the accelerator pedal, whereby when the accelerator pedal is released, the movable member sequentially bridges the gaps between the contacts of the light source circuits to thereby energize the light sources in sequence and display visible caution light signals.

4. In a motor vehicle deceleration indicator in accordance with claim 3, wherein the circuits to the light sources are sequentially energized as the accelerator pedal is released, said light source circuits being constructed and arranged whereby, when the accelerator pedal is in the released position one of the light source circuits is continuously energized and the remaining light source circuits are intermittently energized, whereby to simultaneously display a constant caution light signal and flashing caution light signals.

References Cited
UNITED STATES PATENTS

| | | |
|---|---|---|
| 2,750,578 | 6/1956 | Petrella et al. _____ 340—72 XR |
| 3,243,773 | 3/1966 | Leichsenring _____ 340—72 |
| 3,320,586 | 5/1967 | Wagner _____ 340—71 XR |

JOHN W. CALDWELL, *Primary Examiner.*

ALVIN H. WARING, *Examiner.*